United States Patent
Ishii et al.

(12) 
(10) Patent No.: US 6,190,746 B1
(45) Date of Patent: *Feb. 20, 2001

(54) POLISHING CLOTH AND A METHOD FOR ATTACHING/DETACHING THE POLISHING CLOTH TO/FROM A BASE PLATE OF A POLISHING MACHINE

(76) Inventors: Hideyuki Ishii; Yoshitane Shigeta, both of c/o Rodel Nitta Company Nara Factory, 172, Ikezawa-cho, Yamatokoriyama-shi, Nara-ken 639-11 (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/945,477

(22) PCT Filed: Apr. 24, 1996

(86) PCT No.: PCT/JP96/01110
§ 371 Date: Jan. 20, 1998
§ 102(e) Date: Jan. 20, 1998

(87) PCT Pub. No.: WO96/33842
PCT Pub. Date: Oct. 31, 1996

(30) Foreign Application Priority Data

Apr. 25, 1995 (JP) .................................................. 7-101379

(51) Int. Cl.$^7$ .................................................. B24D 11/00

(52) U.S. Cl. ........................ 428/40.1; 428/41.5; 428/41.8; 428/355; 451/490; 451/533; 451/538; 451/539; 451/548; 451/549; 451/550; 451/921

(58) Field of Search .................. 428/40.1, 41.5, 428/41.8, 355; 451/550, 549, 921, 548, 490, 533, 538, 539

(56) References Cited

U.S. PATENT DOCUMENTS

| | | | |
|---|---|---|---|
| 3,954,697 | 5/1976 | McConnell et al. | 526/350 |
| 4,217,428 | 8/1980 | McConnell et al. | 525/191 |
| 4,895,033 | * 1/1990 | Voss | 451/921 |
| 4,979,337 | * 12/1990 | Duppstadt | 451/550 |
| 5,156,911 | 10/1992 | Stewart | 428/355 |
| 5,387,450 | * 2/1995 | Stewart | 428/40.4 |

FOREIGN PATENT DOCUMENTS

| | | |
|---|---|---|
| 0414346 | 2/1991 | (EP) . |
| 0418093 | 3/1991 | (EP) . |
| 0513772 | 11/1992 | (EP) . |
| 4507425 | 12/1992 | (JP) . |
| WO 90/13420 | 11/1990 | (WO) . |

OTHER PUBLICATIONS

International Search Report dated Sep. 4, 1996 (PCT/JP96/01110).

* cited by examiner

Primary Examiner—Nasser Ahmad
(74) Attorney, Agent, or Firm—Fulbright & Jaworski LLP (57) ABSTRACT

A polishing cloth according to the present invention includes: a polishing cloth substrate; a pressure-sensitive adhesive layer laminated on one face of the polishing cloth substrate; and a release sheet attached to the pressure-sensitive adhesive layer in a releasable manner. The pressure-sensitive adhesive layer includes an adhesive composition containing a polymer, the polymer having a first-order melt transition in a temperature range narrower than 15° C. Thus, the present invention provides a polishing cloth and a method for attaching/detaching the polishing cloth to/from a base plate of a polishing machine such that the polishing cloth can be peeled off the base by simply cooling the base plate and the adhesive layer of the polishing cloth.

10 Claims, 2 Drawing Sheets

POLISHING CLOTH AND A METHOD FOR ATTACHING/DETACHING THE POLISHING CLOTH TO/FROM A BASE PLATE OF A POLISHING MACHINE

TECHNICAL FIELD

The present invention relates to a polishing cloth which is attached to a base plate of a polishing machine when a workpiece to be polished such as a semi-conductor wafer is polished and used to polish the workpiece, and a method for attaching/detaching the polishing cloth to/from the base plate of the polishing machine.

BACKGROUND ART

In recent years in the semiconductor industry, the integration level of ICs has rapidly increased. It has increased from 4M to 16M and is now proceeding to the 64M level.

In light of the above circumstances, demand for a wafer having a higher-quality surface from which ICs are formed has increased. In order to increase the integration level of ICs, aside from improvement of the chemical and electrical properties of the wafer, reduction of the minimum width allocated for devices to be formed on the wafer is increasingly demanded. Now, 0.35 microns is requested, as compared to 0.5 microns in the past. Moreover, the size of the wafer has rapidly increased, followed by rapid reduction of cost per bit. With the increase in the size of the wafer, the size of machines for processing the wafer has increased. For example, in the polishing process for mirror-finishing the wafer surface, a polishing machine with a base plate having a diameter of about 42 inches is used for 5'-diameter wafers, while a polishing machine with a base plate having a diameter as large as 59 inches is used to polish 8'-diameter wafers. In general, the polishing of wafers is performed by causing friction with a polishing cloth in the presence of a polishing slurry, while retaining the polishing cloth on a lower base plate of a polishing machine and the wafer to be processed on an upper base plate.

The size of the polishing cloth should therefore be the same as that of the lower base plate of the polishing machine. Specifically, a polishing cloth with a diameter of about 42 inches is generally used for polishing 5'-diameter wafers, while a polishing cloth with a diameter of 59 inches is used for polishing 8'-diameter wafers.

In general, the polishing cloth is secured to the base plate of the polishing machine with a high-performance double-sided adhesive tape; that is, a tape having adhesive layers on the both sides. Such an adhesive tape is attached to the back surface of the polishing cloth. In this securing method, however, such an adhesive layer formed on the back surface of the polishing cloth is adhered to the base plate so firmly that a tack strength as large as about 2 to 3 kg/inch width is exhibited when the polishing cloth attached to the base plate is intended to be detached in a general manner. This means that a force of 156 kg at minimum is required to detach the polishing cloth from the base plate with a diameter of 42 inches, while a force of 180 kg at minimum is required when a base plate with a diameter of 59 inches is used. Thus, it takes an extraordinarily large amount of labor to exchange a used polishing cloth with a new one.

Thus, the invention described herein makes possible the advantages of (1) providing a polishing cloth which adheres to a base plate of a polishing machine firmly, stably, and precisely when a wafer is polished and is easily detached from the base plate when intended to be detached, (2) providing a method for attaching/detaching such a polishing cloth to/from the base plate of the polishing machine, (3) providing a polishing cloth which, when being exchanged or replaced, can be easily peeled off a base plate of a polishing machine by simply cooling the base plate and an adhesive layer of the polishing cloth, and (4) providing a method for attaching/detaching such a polishing cloth to/from the base plate of the polishing machine.

DISCLOSURE OF THE INVENTION

A polishing cloth according to the present invention includes: a polishing cloth substrate; a pressure-sensitive adhesive layer laminated on one face of the polishing cloth substrate; and a release sheet attached to the pressure-sensitive adhesive layer in a releasable manner, wherein the pressure-sensitive adhesive layer includes an adhesive composition containing a polymer, the polymer having a first-order melt transition occurring in a temperature range narrower than about 15° C.

In one embodiment of the invention, the polymer is a side-chain crystallizable polymer, the side-chain crystallizable polymer being included in an amount such that the pressure-sensitive adhesive layer becomes substantially untacky to a base plate of a polishing machine at about 20° C. or less and substantially tacky to the base plate of the polishing machine at a temperature higher than about 20° C.

In another embodiment of the invention, the side-chain crystallizable polymer includes as a main component thereof an acrylic acid ester and/or methacrylic acid ester which has a straight-chain alkyl group including 10 or more carbons as a side chain.

In still another embodiment of the invention, the side-chain crystallizable polymer is a copolymer of (meth)acrylate having 10 to 14 carbon atoms and at least one monomer selected from the group consisting of acrylic acid and (meth)acrylate having 1 to 4 carbon atoms.

In still another embodiment of the invention, the copolymer includes the following components: about 40% to about 95% by weight of (meth)acrylate having 10 to 14 carbon atoms; about 1% to about 10% by weight of acrylic acid; and/or about 5% to about 40% by weight of (meth)acrylate having 1 to 4 carbon atoms.

A method for attaching/detaching the polishing cloth according to the present invention to/from a base plate of a polishing machine includes the steps of: attaching the polishing cloth to the base plate of the polishing machine by removing the release sheet of the polishing cloth from the pressure-sensitive adhesive layer, and thereafter allowing the pressure-sensitive adhesive layer of the polishing cloth to adhere to the base plate of the polishing machine while keeping the base plate at a temperature T1; and after use of the polishing cloth, detaching the polishing cloth from the base plate of the polishing machine while cooling the base plate from the temperature T1 to a temperature T2, the temperature T2 being lower than the temperature T1.

In one embodiment of the invention, the temperature T1 is about 20° C. or higher, and the temperature T2 is below about 20° C.

In another embodiment of the invention, the temperature T1 is about 25° C. or higher, and the temperature T2 is below about 20° C.

BEST MODE FOR CARRYING OUT THE INVENTION

Figure 1:
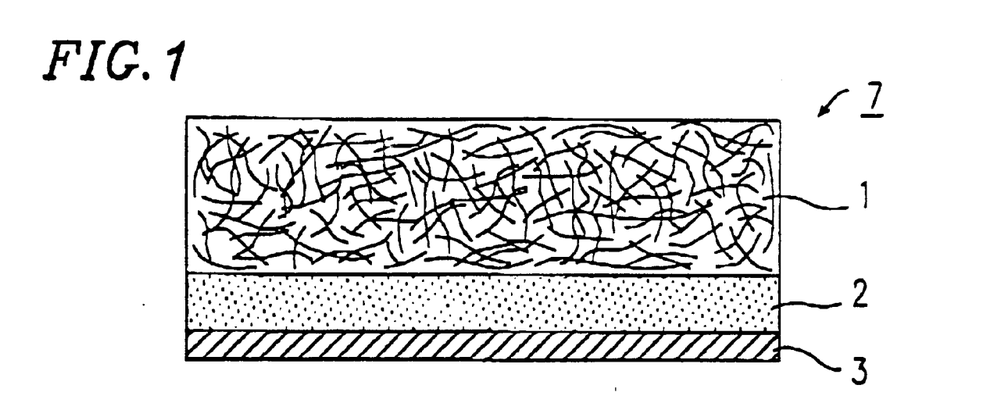
FIG. 1 is a sectional view of a polishing cloth according to the present invention.

Referring to FIG. 1, the polishing cloth of the present invention includes, at least, a polishing cloth substrate 1, a pressure-sensitive adhesive layer 2 formed on one surface of the polishing cloth substrate 1, and a release sheet 3 releasably attached to the pressure-sensitive adhesive layer 2.

(Polishing Cloth Substrate)

The substrate of the polishing cloth of the present invention is composed of a composition of at least one of the polymers selected from the group consisting of polyurethane resin, epoxy resin, and vinyl resin (for example, a foam body) or a composite of the above composition and a base material. Examples of the foam body and the composite are described in detail as follows.

(1) Foam body

The foam body may be formed, for example, by solidifying a foam composition containing urethane polymer and dimethylformamide by a wet solidification method. Alternatively, a foam composition containing urethane polymer, vinyl polymer such as vinyl chloride polymer, vinyl chloride-vinyl acetate copolymer, and vinyl chloride-vinyl acetate-vinyl alcohol ternary polymer, and a suitable foam solvent such as dimethylformaldehyde may be used to form a foam body by the wet solidification method. The surface area of the foam body, especially a skin layer formed on the surface, is preferably buffed so that a foam structure is exposed.

As the urethane polymer, any of polyether urethane resins, polyester urethane resins, and polyesterether urethane resins can be used. Examples of a polyol component used for the production of the urethane resin include poly(oxyethylene glycol), poly(oxypropylene glycol), poly(oxytetramethylene glycol), polyethylene adipate, polypropylene adipate, and poly(oxytetramethylene adipate). Examples of an isocyanate component used in the production of the urethane resin include 4,4'-diphenylmethane diisocyanate, and 2,4-tolylene diisocyanate.

Examples of a chain expander used in the production of the urethane resin include ethylene glycol, 1,4-butanediol, and propylene glycol.

For example, poly(oxypropylene glycol) is used as the polyol component, 4,4'-diphenylmethane diisocyanate as the isocyanate component, 1,4-butanediol as the chain expander, ethanol as a polymerization inhibitor, and dimethylformamide as a solvent, to form a dimethylformamide solution of urethane polymer.

The foam composition may contain a filler such as carbon black, a dispersion stabilizer such as a surfactant, and a wet solidification auxiliary.

The thus-obtained foam composition is applied to a support of which surface portion is releasable, to obtain the foam body by the wet solidification method described below.

The support with the foam composition applied thereto is immersed in water of a predetermined temperature and then in hot water of a predetermined temperature for a predetermined period of time. During immersion, the solvent contained in the foam composition is replaced with water by osmosis, removing the solvent from the foam composition and thereby lowering the foaming of the foam composition. Thus, an elastic foam body is formed on the support. The resultant support with the foam body formed thereon is taken out from the water, dried with hot air at a predetermine temperature for a predetermined period of time, and buffed to obtain the foam body.

(2) Composite

The composite can be produced by impregnating a base material with the above foam composition and solidifying the resultant material by the wet solidification method as described above. As the base material, fabrics such as a nonwoven fabric (for example, BS-300, Nippon Felt Co., Ltd.) can be used.

(Adhesive Layer)

The adhesive layer is formed on the back surface of the polishing cloth substrate.

An adhesive composition for forming the adhesive layer contains a polymer having a first-order melt transition occurring in a range narrower than about 15° C. The adhesive composition is a polymer composition having a first melt transition somewhere between about 5° C. and 50° C. This transition occurs preferably in a range narrower than about 15° C., more preferably in a range narrower than about 10° C.

The first-order melt transition of the polymer can be measured by a viscoelasticity meter.

As disclosed in Japanese National Phase PCT Laid-Open Publication No. 4-507425, the adhesive composition contains a sufficient amount of a side-chain crystallizable polymer so that the resultant adhesive layer can be substantially non-tacky to the base plate of the polishing machine at a temperature of about 20° C. or less and substantially tacky to the base plate at a temperature more than about 20° C.

The temperature T1 of the polishing cloth during the polishing of the wafer is preferably in the range of about 25 to about 35° C., more preferably in the range of about 25 to about 30° C. The temperature T2 of the polishing cloth at the detachment of the polishing cloth from the base plate is preferably in the range of about 15 to about 25° C., more preferably in the range of about 15 to about 20° C.

As the side-chain crystallizable polymer, side-chain crystallizable and main-chain crystallizable polymers, are preferred. These polymers include polymers which exhibit the temperature-dependent adhesion properties. Crystallizable polymers which may be used in the adhesive composition include both side-chain crystallizable and main-chain crystallizable polymers. The side-chain crystallizable polymers contain crystallizable side-chain moieties, while the main-chain crystallizable polymers are rendered crystallizable by their backbone structure. Examples of such polymers include those selected from the group consisting of single stereoregular polyolefin alkylacrylate, and alkylmethacrylate.

The side-chain crystallizable polymer used in the present invention can be formulated so as to contain a mixture of two or more different polymers.

In general, these polymers contain monomer units X of the formula:

wherein M is a bivalent group capable of forming a main chain of a polymer (or a backbone atom(s)), S is a spacer unit, and C is a crystallizable group. These polymers generally have a heat of fusion (ΔHf) of at least about 20 Joules/g, preferably at least about 40 Joules/g.

The polymers contain about 50 to about 100 wt. % monomer units represented by "X". If the polymer contains less than 100% X, it additionally contains monomer units which may be represented by "Y" or "Z", or both, wherein Y is any polar or nonpolar monomer or mixture of polar or nonpolar monomers capable of polymerizing with X or Z, and Z is a mixture of polar or nonpolar monomers.

Examples of the polar monomers include polyoxyalkylenes, acrylates including hydroxyethylacrylate, acrylamides, and methacrylamide. These monomers increase adhesion to most substrates.

The backbone of the polymer (defined by "M") may be any organic structure (aliphatic or aromatic hydrocarbon, ester, ether, amide, etc.) or an inorganic structure (sulfide, phosphazine, silicone, etc.), and may include spacer linkages which can be any suitable organic or inorganic unit, for example, ester, amide, hydrocarbon, phenyl, ether, or ionic salt (e.g., a carboxyl-alkyl ammonium or sulphonium or phosphonium ion pair or other known ionic salt pair).

The side-chain (defined by "S" and "C") may be aliphatic or aromatic or a combination of aliphatic and aromatic, but must be capable of entering into a crystalline state. Common examples are: linear aliphatic side-chains of at least 10 carbon atoms, e.g., $C_{14}$–$C_{22}$ acrylates or methacrylates, acrylamides or methacrylamides, vinyl ethers or esters, siloxanes or alpha olefins; fluorinated aliphatic side-chains of at least 6 carbon atoms; and p-alkyl styrene side-chains wherein the alkyl group contains 8 to 24 carbon atoms.

The length of the side-chain moiety is usually greater than 5 times the distance between side-chains in the case of acrylates, methacrylates, vinyl esters, acrylamides, methacrylamides, vinyl ethers, and α-olefins.

The side-chain units should make up greater than about 50% of the volume of the polymer, preferably greater than about 65% of the volume.

In addition to the one or more types of the above-described polymers, the adhesive composition may contain conventional additives such as a tackifier (e.g., rosin, polyester), an antioxidant, a fibrous or non-fibrous filler, and a colorant. An additional adhesive may also be contained in the adhesive composition unless it significantly affects the overall temperature-sensitive property of the adhesion composition. The amount of the crystallizable polymer contained in the adhesive composition is preferably in the range of about 40% by weight to about 100% by weight and preferably from about 70% by weight to about 98% by weight.

Especially suitable examples of the polymer contained in the adhesive composition are as follows:

(1) a copolymer of 90–97 parts by weight of tetradecyl acrylate and 3–10 parts by weight of acrylic acid;

(2) a copolymer of 10–60 parts by weight of lauryl acrylate, 40–90 parts by weight of tetradecyl acrylate, and 3–10 parts by weight of acrylic acid;

(3) a copolymer of 70–90 parts by weight of tetradecyl acrylate, 5–20 parts by weight of butyl acrylate, and 3–10 parts by weight of acrylic acid: and (4) a copolymer of 70–90 parts by weight of hexadecyl acrylate, 5–20 parts by weight of butyl acrylate, and 3–10 parts by weight of acrylic acid.

The suitable temperatures at use of the adhesive compositions including the above copolymers (1) to (4) are as follows:

(1) about 20° C.; the temperature at which the adhesiveness greatly lowers is about 15° C. or less;

(2) about 10 to about 20° C.; the temperature at which the adhesiveness greatly lowers is about 5° C. or less when about 10° C. is used and about 15° C. or less when about 20° C. is used;

(3) about 0 to about 15° C.; the temperature at which the adhesiveness greatly lowers is about −5° C. or less when about 0° C. is used and about 10° C. or less when about 15° C. is used;

(4) about 15 to about 35° C.; the temperature at which the adhesiveness greatly lowers is about 10° C. or less when about 15° C. is used and about 30° C. or less when about 35° C. is used.

Especially suitable is a copolymer of (meth)acrylate having 10–14 carbon atoms, acrylic acid, and/or (meth)acrylate having 1–4 carbon atoms, of which temperature sensitivity and tackiness are well balanced. Such a copolymer contains about 40% by weight or more, preferably about 45% to about 95% by weight of (meth)acrylate having 10–14 carbon atoms, about 1% to about 10% by weight, preferably about 2% to about 5% by weight of acrylic acid, and/or 5% to 40% by weight, preferably about 10% to about 35% by weight of (meth)acrylate.

The adhesive composition containing the polymer exhibiting the above-described temperature-dependent adhesion properties may be directly applied to the polishing cloth substrate to form the adhesive layer with a uniform thickness. Alternatively, the adhesive composition may be thinly and uniformly applied to a thin sheet substrate, and then the resultant substrate with the adhesive layer may be laminated with the polishing cloth substrate.

The adhesive composition may be applied per se or as an emulsion or a latex with an appropriate solvent. Appropriate monomers which can form a polymer and additives may be directly applied to the foam layer or the sheet substrate and cured by heating, radiation, or any other appropriate method known to those skilled in the art.

A release sheet (or a release film) is attached to the exposed surface of the adhesive layer, so that the adhesive layer is protected by the release sheet until the polishing cloth is actually used. The release sheet is composed of a soft thin film, for example, a paper sheet, a plastic film such as a polypropylene film, and a metal foil, which is surface-treated with a release agent, if necessary, to facilitate releasing. In particular, a silicone-treated polyester film is preferred because of its dusting characteristics and smoothness.

The polishing cloth with the above structure is attached to the base plate of the polishing machine typically in the following manner.

First, the base plate of the polishing machine is cleaned. The polishing cloth is taken out from a package at room temperature (generally, about 25° C.) and, removing the release sheet from the tacky surface, attached to the base plate. At this time, an end of the release sheet is first removed and, aligning with an end of the base plate, attached to the end of the base plate, followed by gradual attachment of the total surface.

Then, the polishing is performed using a test dummy.

Through the above process, the adhesive layer on the back surface of the polishing cloth firmly adheres to the base plate. The tack strength of the polishing cloth attached to the basis plate at this time is as large as about 2 to 3 kg/inch width, which is exhibited when the former is intended to be detached from the latter in a general manner.

After the attachment of the polishing cloth to the polishing machine in the above manner and subsequent processing of the wafer, the polishing cloth is detached from the base plate in the following manner. The tackiness of the temperature-activated pressure-sensitive adhesive formed on the back surface of the polishing cloth rapidly decreases by cooling the base plate by about 5° below room temperature, i.e., to about 20° C. The tack strength lowers to about 0.2 to 0.5 kg/inch width, allowing the polishing cloth from detaching from the base plate easily.

The base plate and the polishing cloth may be cooled by immersing them in water or cold water, showering them with water or cold water, or exposing them to a cold air blow.

Thus, in the polishing cloth according to the present invention, the adhesive composition constituting the adhesive layer includes a polymer having a first-order melt transition occurring in a range narrower than about 15° C. With such an adhesive composition including a temperature-activated pressure-sensitive adhesive, the tackiness of the adhesive layer to the base plate can be greatly lowered by cooling the base plate and the adhesive layer of the polishing cloth. Thus, the polishing cloth can be easily detached from the base plate at the time of exchanging a used polishing cloth with a new one.

The first-order melt transition refers to a phenomenon occurring at a temperature in between and about in the middle of the glass transition point and the melting point, observed when the viscoelasticity of a polymer is measured by gradually increasing the temperature. By slightly varying the temperature from an arbitrarily set temperature (for example, 2 to 5° C.), the polymer becomes crystalline or non-crystalline reversibly, resulting in a substantial change in the tackiness of the polymer to the base plate as described above.

Hereinafter, the present invention will be specifically described by way of examples. However, the invention is not limited to the examples.

EXAMPLE 1

A polyester nonwoven fabric was impregnated with Composition I (having the composition shown in Table 1), and Composition 1 was allowed to wet-coagulate. This composite was then subjected to a washing process and a drying process, whereby an original cloth having skin layers on both faces was obtained. The outermost 100 microns of each face of this original cloth was buffed off, whereby a polishing cloth substrate 1 shown in FIG. 2 was obtained.

Figure 3:
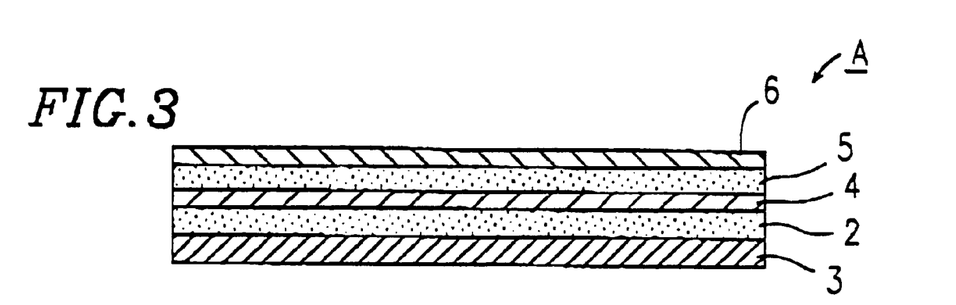
FIG. 3 is a sectional view of a double-sided adhesive tape.

As shown in FIG. 3, a temperature-activated pressure-sensitive adhesive (manufactured by Landeck Corporation) was coated at a thickness of 50 microns on one face of a polyester film 4 (Lumirror, manufactured by Toray Industries, Inc.; thickness: 25 microns), thereby forming an adhesive layer 2. On the other face of this polyester film 4, a conventional adhesive composition (AR-798: an acrylic adhesive manufactured by Sankyo Chemical Co., Ltd.) was coated so as to have a thickness of 50 microns, thereby forming an adhesive layer 5. Then, each adhesive layer 2, 5 was covered with a release sheet 3 or 6. Thus, a double coated adhesive film A with release sheets 3, 6 was obtained.

Figure 4:
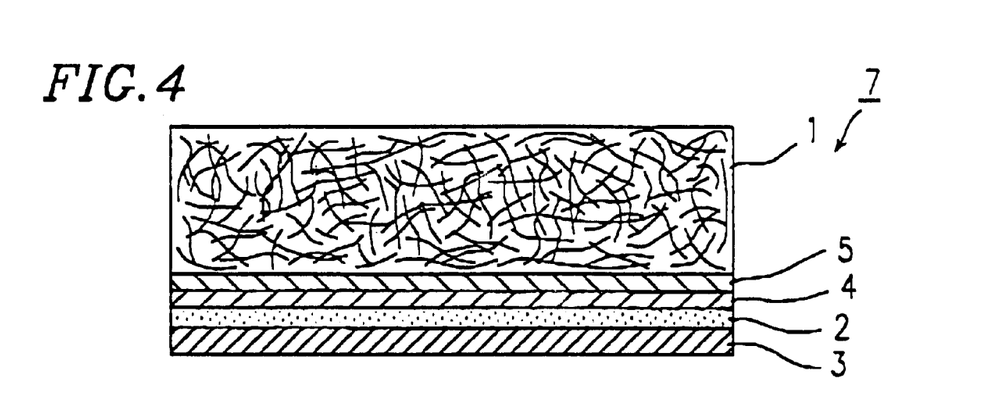
FIG. 4 is a sectional view of another polishing cloth according to the present invention.

The release sheet 6 on the adhesive layer 5 of the above adhesive film A was peeled, and thus the adhesive layer 5 of the above adhesive film A was exposed and attached to the polishing cloth substrate 1 as shown in FIG. 4, thereby producing a polishing cloth 7 with a temperature-activated pressure-sensitive adhesive provided thereon.

Next, the polishing cloth 7 was cut into a circle having a diameter of 60 inches. The release sheet 3 was peeled off the temperature-activated pressure-sensitive adhesive 2, and the polishing cloth 7 was lightly attached to a ceramic lower base plate (diameter: 59 inches) of a polishing machine. The adhesion temperature was at 25° C.

A dummy object was subjected to polishing for several minutes using the polishing machine in order to ensure that the adhesive securely gained intimacy with the base plate. Thereafter, wafers were polished under the conditions described in Table 2. Fifty polishes, each requiring 30 minutes, were continuously performed. After the polishing cloth was thus used, the non-usable polishing cloth 7, still attached to the base plate, was exposed under cold water at about 20° C. for 5 minutes. Thus, the polishing cloth 7 having the temperature-activated pressure-sensitive adhesive easily peeled off the base plate at a peeling force of at most 12 kg.

TABLE 1

| | |
|---|---|
| Ester-type polyurethane (CRISVON-7667; manufactured by Dainippon Ink and Chemicals, Inc.) | 100 phr |
| dimethylformamide (manufactured by Nitto Chemical Industry Co., Ltd.) | 50 phr |
| Pigment (DILAC-5442; manufactured by Dainippon Ink and Chemicals, Inc.) | 20 phr |
| Surfactant (K ASSISTOR SD-7; manufactured by Dainippon Ink and Chemicals, Inc.) | 3 phr |

TABLE 2

| | |
|---|---|
| Polishing maching | Speed fam Single-side polishing machine (59SPAW) with a base plate (diameter: 59 inches) |
| Wafer to be processed | Silicon monocrystal P (100) wafer (diameter: 8 inches) |
| Polishing slurry | NALCO2350; diluted by 20 times (manufactured by Nalco Chemical Company) |
| Processing pressure | 300 g/cm$^2$ |
| Slurry flow rate | 1000 ml/min. |
| Processing time | 30 min. |

EXAMPLE 2

Figure 5:
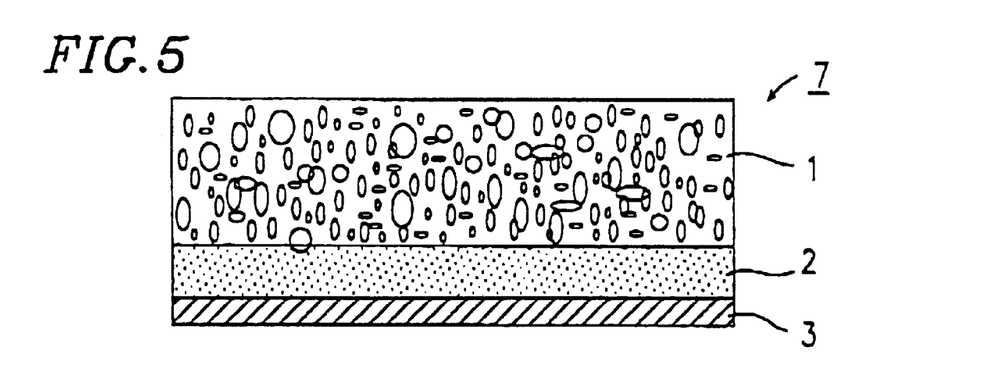
FIG. 5 is a sectional view of yet another polishing cloth according to the present invention.

A polishing cloth 7 shown in FIG. 5 was produced as follows. A temperature-activated pressure-sensitive adhesive 2 (manufactured by Landeck Corporation) was directly coated at a thickness of 20 microns on a back face of a polyurethane foam polishing cloth substrate 1 (IC 1000, manufactured by RODEL CORPORATION), and a release sheet 3 was attached to the adhesive layer 2.

Next, the polishing cloth 7 was cut into a circle having a diameter of 24 inches. The release sheet 3 was peeled off the temperature-activated pressure-sensitive adhesive 2, and the polishing cloth 7 was lightly attached to a lower base plate (diameter: 23 inches) of a polishing machine. The adhesion temperature was at 25° C.

A dummy object was subjected to polishing for several minutes using the polishing machine in order to ensure that the adhesive securely gained intimacy with the base plate. Thereafter, wafers were polished under the conditions described in Table 3. One hundred and fifty polishes, each requiring 5 minutes, were continuously performed. After the polishing cloth was thus used, the non-usable polishing cloth, still attached to the base plate, was exposed under cold water at about 20° C. for 10 minutes. Thus, the polishing cloth having the temperature-activated pressure-sensitive adhesive easily peeled off the base plate at a peeling force of at most 4.8 kg.

TABLE 3

| | |
|---|---|
| Polishing machine | Westech 372 with a base plate (diameter: 23 inches) |
| Wafer to be processed | Silicon wafer (diameter: 8 inches) provided with an oxide film |
| Polishing slurry | ILD 1300 (manufactured by Rodel Inc.) |
| Processing pressure | 600 g/cm$^2$ |
| Slurry flow rate | 200 ml/min. |
| Processing time | 5 min. |

Comparative Example 1

As in Example 1, a polyester nonwoven fabric was impregnated with Composition I (having the composition shown in Table 1), and Composition 1 was allowed to wet-coagulate. This composite was then subjected to a washing process and a drying process, whereby an original cloth having skin layers on both faces was obtained. The outermost 100 microns of each face of this original cloth was buffed off, whereby a polishing cloth substrate 1 having the structure shown in FIG. 2 was obtained.

Figure 2:
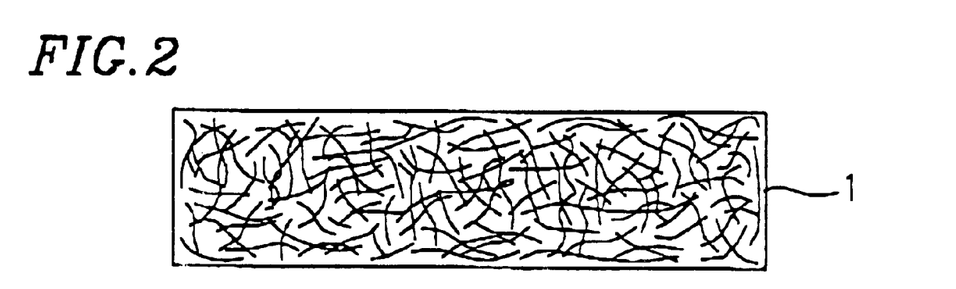
FIG. 2 is a sectional view of a substrate of the polishing cloth.

A commercially available double coated adhesive tape (ST-442, manufactured by Sumitomo 3M Corporation), consisting essentially of a polyester film (Lumirror, manufactured by Toray Industries, Inc.; thickness: 25 microns) with a conventional adhesive (thickness: 50 microns) coated on both sides thereof, was attached to a back face of the polishing cloth substrate 1. Thus, a polishing cloth with a conventional double coated adhesive tape was produced.

Next, the polishing cloth was cut into a circle having a diameter of 60 inches. The release sheet was peeled, and the polishing cloth was lightly attached to a lower base plate (diameter: 59 inches) of a polishing machine. The adhesion temperature was at 25° C.

A dummy object was subjected to polishing for several minutes using the polishing machine in order to ensure that the adhesive securely gained intimacy with the base plate. Thereafter, wafers were polished under the conditions described in Table 2. Fifty polishes, each requiring 30 minutes, were continuously performed. After the polishing cloth was thus used, the non-usable polishing cloth, still attached to the base plate, was peeled off the base plate, which required a peeling force of about 120 kg.

EXAMPLE 3

(Hereinafter, "parts" represent "parts by weight".)
A. Preparation of a Pressure-sensitive Adhesive Forty-five parts of tetradecylacrylate, 50 parts of dodecylacrylate, 5 parts of acrylic acid, and 0.3 parts of azobisisobutyronitrile (AIBN) were mixed in 200 parts of toluene, and stirred at 60° C. for 20 hours to allow the monomers to polymerize. The resultant polymer had a molecular weight of about 500,000 and a melting point of 10° C.

A polymer solution was prepared by using a solvent (heptane:ethyl acetate=90 parts:10 parts) so that the solid portion in the polymer solution accounted for 30% by weight. A temperature-activated pressure-sensitive adhesive was obtained by adding 0.1 parts of a cross-linking agent (Kemitaito PZ-33; manufactured by NIPPON SHOKUBAI Co., Ltd.) to 100 parts of this polymer solution.

B. Fabrication of a Polishing Cloth and an Evaluation Thereof

A double coated adhesive film B with release sheets provided thereon was obtained in the same manner as the double coated adhesive film A in Example 1 was produced, except that the above-mentioned temperature-activated pressure-sensitive adhesive was used in the place of the temperature-activated pressure-sensitive adhesive (manufactured by Landeck Corporation) of the double coated adhesive film A.

A polishing cloth was obtained in the same manner as the polishing cloth of Example 1 was obtained, except for using the double coated adhesive film B having release sheets. The resultant polishing cloth was evaluated in the same manner as in Example 1, except that the polishing cloth was peeled off the base plate by being immersed in pure water at about 0° C.

The polishing cloth adhered well to the lower base plate during wafer polishing. The polishing cloth easily peeled off the lower base plate at a peeling force of about 9 kg.

EXAMPLE 4

A. Preparation of a Pressure-sensitive Adhesive

Ninety-five parts of tetradecylacrylate, 5 parts of acrylic acid, and 0.3 parts of AIBN were mixed in 200 parts of toluene, and stirred at 60° C. for 20 hours to allow the monomers to polymerize. The resultant polymer had a molecular weight of about 500,000 and a melting point of 21° C.

A polymer solution was prepared by using a solvent (heptane:ethyl acetate=90 parts:10 parts) so that the solid portion in the polymer solution accounted for 30% by weight. A temperature-activated pressure-sensitive adhesive was obtained by adding 0.1 parts of a cross-linking agent (Kemitaito PZ-33) to 100 parts of this polymer solution.

B. Fabrication of a Polishing Cloth and an Evaluation Thereof

A double coated adhesive film C with release sheets provided thereon was obtained in the same manner as the double coated adhesive film A in Example 1 was produced, except that the above-mentioned temperature-activated pressure-sensitive adhesive was used in the place of the temperature-activated pressure-sensitive adhesive (manufactured by Landeck Corporation) of the double coated adhesive film A.

A polishing cloth was obtained in the same manner as the polishing cloth of Example 1 was obtained, except for using the above-mentioned double coated adhesive film C having release sheets. The resultant polishing cloth was evaluated in the same manner as in Example 1, except that the polishing cloth was peeled off the base plate by being immersed in pure water at about 10° C.

The polishing cloth adhered well to the lower base plate during wafer polishing. The polishing cloth easily peeled off the lower base plate at a peeling force of about 7 kg.

EXAMPLE 5

A. Preparation of a Pressure-sensitive Adhesive

Fifty parts of hexadecylacrylate, 45 parts of dodecylacrylate, 5 parts of acrylic acid, and 0.3 parts of AIBN were mixed in 200 parts of toluene, and stirred at 60° C. for 20 hours to allow the monomers to polymerize. The resultant polymer had a molecular weight of about 500,000 and a melting point of 20° C.

A polymer solution was prepared by using a solvent (heptane:ethyl acetate=90 parts:10 parts) so that the solid portion in the polymer solution accounted for 30% by weight. A temperature-activated pressure-sensitive adhesive was obtained by adding 0.1 parts of a cross-linking agent (Kemitaito PZ-33) to 100 parts of this polymer solution.

B. Fabrication of a Polishing Cloth and an Evaluation Thereof

A double coated adhesive film D with release sheets provided thereon was obtained in the same manner as the double coated adhesive film A in Example 1 was produced, except that the above-mentioned temperature-activated pressure-sensitive adhesive was used in the place of the temperature-activated pressure-sensitive adhesive (manufactured by Landeck Corporation) of the double coated adhesive film A.

A polishing cloth was obtained in the same manner as the polishing cloth of Example 1 was obtained, except for using the above-mentioned double coated adhesive film D having release sheets. The resultant polishing cloth was evaluated in the same manner as in Example 1, except that the polishing cloth was peeled off the base plate by being immersed in pure water at about 10° C.

The polishing cloth adhered well to the lower base plate during wafer polishing. The polishing cloth easily peeled off the lower base plate at a peeling force of about 6 kg.

EXAMPLE 6

A. Preparation of a Pressure-sensitive Adhesive

Seventy-five parts of hexadecylacrylate, 20 parts of butylacrylate, 5 parts of acrylic acid, and 0.3 parts of AIBN were mixed in 200 parts of toluene, and stirred at 60° C. for 20 hours to allow the monomers to polymerize. The resultant polymer had a molecular weight of about 400,000 and a melting point of 20° C.

A polymer solution was prepared by using a solvent (heptane:ethyl acetate=90 parts:10 parts) so that the solid portion in the polymer solution accounted for 30% by weight. A temperature-activated pressure-sensitive adhesive was obtained by adding 0.1 parts of a cross-linking agent (Kemitaito PZ-33) to 100 parts of 5 this polymer solution.

B. Fabrication of a Polishing Cloth and an Evaluation Thereof

A double coated adhesive film E with release sheets provided thereon was obtained in the same manner as the double coated adhesive film A in Example 1 was produced, except that the above-mentioned temperature-activated pressure-sensitive adhesive was used in the place of the temperature-activated pressure-sensitive adhesive (manufactured by Landeck Corporation) of the double coated adhesive film A.

A polishing cloth was obtained in the same manner as the polishing cloth of Example 1 was obtained, except for using the above-mentioned double coated adhesive film E having release sheets. The resultant polishing cloth was evaluated in the same manner as in Example 1, except that the polishing cloth was peeled off the base The polishing cloth adhered well to the lower base plate during wafer polishing. The polishing cloth easily peeled off the lower base plate at a peeling force of about 10 kg.

Comparative Example 2

An adhesive composed of 100 parts of butylacrylate, 5 parts of acrylonitrile, and 5 parts of acrylic acid was prepared.

A double coated adhesive film with release sheets provided thereon was obtained in the same manner as the double coated adhesive film A in Example 1 was produced, except that the above-mentioned temperature-activated pressure-sensitive adhesive was used in the place of the temperature-activated pressure-sensitive adhesive (manufactured by Landeck Corporation) of the double coated adhesive film A.

A polishing cloth was obtained in the same manner as the polishing cloth of Example 1 was obtained, except for using the above-mentioned double coated adhesive film having release sheets. The resultant polishing cloth was evaluated in the same manner as in Example 1.

The polishing cloth adhered well to the lower base plate during wafer polishing. The polishing cloth peeled off the lower base plate at a peeling force of about 40 kg.

The exchanging or replacement of a polishing cloth according to the present invention, conducted after each polishing process, is substantially facilitated because the polishing cloth can be peeled off a base plate by simply cooling the base plate and an adhesive layer of the polishing cloth.

What is claimed is:

1. A polishing cloth comprising;

a polishing cloth substrate;

a laminated adhesive layer;

a film;

a pressure-sensitive adhesive layer laminated in this order on one face of the polishing cloth substrate; and a release sheet attached to the pressure-sensitive adhesive layer adhesive layer in a releaseable manner, wherein the pressure-sensitive adhesive layer comprises an adhesive composition containing a polymer, the polymer having a first-order melt transition occurring in a temperature range narrower than 15° C., wherein the polymer is a side-chain crystallizable polymer, the side-chain crystallizable polymer being comprised in an amount such that the pressure-sensitive adhesive layer becomes substantially untacky to a base plate of a polishing machine at 20° C. or less and substantially tacky to the base plate of the polishing machine at a temperature higher than 20° C.

2. A polishing cloth according to claim 1, wherein the side-chain crystallizable polymer comprises as a main component thereof an acrylic acid ester and/or methacrylic acid ester which has a straight-chain alkyl group including 10 or more carbon atoms as a side chain.

3. A polishing cloth according to claim 1, wherein the side-chain crystallizable polymer is a copolymer of (meth)acrylate having 10 to 14 carbon atoms and at least one monomer selected from the group consisting of acrylic acid and (meth)acrylate having 1 to 4 carbon atoms.

4. A polishing cloth according to claim 3, wherein the copolymer comprises the following components:

40% to 95% by weight of (meth)acrylate having 10 to 14 carbon atoms;

1% to 10% by weight of acrylic acid; and/or

5% to 40% by weight of (meth)acrylate having 1 to 4 carbon atoms.

5. A method for attaching/detaching a polishing cloth to/from a base plate of a polishing machine, the polishing cloth comprising:

a polishing cloth substrate;

a pressure-sensitive adhesive layer laminated on one face of the polishing cloth substrate; and a release sheet attached to the pressure-sensitive adhesive layer in a releasable manner, wherein the pressure-sensitive adhesive layer comprises an adhesive composition containing a polymer, the polymer having a first-order melt transition occurring in a temperature range narrower than 15° C., wherein the polymer is a side-chain crystallizable polymer, the side-chain crystallizable polymer being comprised in an amount such that the pressure-sensitive adhesive layer becomes substantially untacky to a base plate of a polishing machine at 20° C. or less and substantially tacky to the base plate of the polishing machine at a temperature higher than 20° C., wherein the method comprises the steps of:
attaching the polishing cloth to the base plate of the polishing machine by removing the release sheet of the polishing cloth from the pressure-sensitive adhesive layer, and thereafter allowing the pressure-sensitive adhesive layer of the polishing cloth to adhere to the base plate of the polishing machine while keeping the base plate at a temperature T1; and
after use of the polishing cloth, detaching the polishing cloth from the base plate of the polishing machine while cooling the base plate from the temperature T1 to a temperature T2, the temperature T2 being lower than the temperature T1, and
wherein the temperature T1 is 20° C. or higher, and the temperature T2 is below 20° C.

6. A method according to claim 5, wherein the temperature T1 is 25° C. or higher, and the temperature T2 is below 20° C.

7. A polishing cloth comprising:
a polishing cloth substrate;
a pressure-sensitive adhesive layer laminated on one face of the polishing cloth substrate; and
a release sheet attached to the pressure-sensitive adhesive layer in a releasable manner,
wherein the pressure-sensitive adhesive layer comprises an adhesive composition which:
(i) contains 40 to 100% by weight of at least one crystallizable polymer which (a) begins to melt at a temperature $T_0$, and (b) completes melting at a temperature $T_m$, which is at most ($T_0$+15° C.);
(ii) is substantially untacky to a base plate of a polishing machine at temperatures below $T_0$;
(iii) becomes substantially tacky to the base plate of the polishing machine when heated from a temperature below $T_0$ to a temperature above $T_m$;
(iv) becomes substantially untacky to the base plate of the polishing machine when cooled below the temperature $T_0$ from the temperature above $T_m$, and
the crystallizable polymer is a side-chain crystallizable polymer containing the following repeating unit of the formula:

wherein M is a group forming part of the backbone of the polymer, S is a spacer unit, and C is a crystallizable group, and
wherein the temperature $T_0$ is below 20° C., and the temperature re $T_m$ is 20° C. or higher.

8. A polishing cloth according to claim 1, wherein the amount of the crystallizable polymer contained in the adhesive composition is in the range of about 40% by weight to about 100% by weight.

9. A polishing cloth according to claim 1, wherein the amount of the crystallizable polymer contained in the adhesive composition is in the range of about 70% by weight to about 98% by weight.

10. A polishing cloth comprising:
a polishing cloth substrate;
an adhesive layer laminated on the polishing cloth substrate;
a film laminated on the adhesive layer;
a pressure-sensitive adhesive layer laminated on the film; and
a release sheet attached to the pressure-sensitive adhesive layer in a releasable manner,
wherein the pressure-sensitive adhesive layer comprises an adhesive composition containing a polymer, the polymer having a first-order melt transition occurring in a temperature range narrower than 15° C.,
wherein the polymer is a side-chain crystallizable polymer, the side-chain crystallizable polymer being comprised in the adhesive composition in the range of about 40% by weight to about 100% by weight; the side-chain crystallizable polymer being comprised in an amount such that the pressure sensitive adhesive becomes substantially untacky to the base plate of a polishing machine at 20 degrees Celsius or less and substantially tacky to the base plate of the polishing machine at a temperature higher than 20 degrees Celsius.

* * * * *

UNITED STATES PATENT AND TRADEMARK OFFICE
CERTIFICATE OF CORRECTION

PATENT NO. : 6,190,746 B1
DATED : February 20, 2001
INVENTOR(S) : Ishii et al.

It is certified that error appears in the above-identified patent and that said Letters Patent is hereby corrected as shown below:

Title page,
Item [54], Title, please add -- A -- before "POLISHING CLOTH" therefor.
Item [73], Assignee, please add -- Nitta Corporation, Osaka, Japan -- therefor.

Signed and Sealed this

Thirteenth Day of November, 2001

Attest:

*Nicholas P. Godici*

NICHOLAS P. GODICI
*Attesting Officer* *Acting Director of the United States Patent and Trademark Office*